(12) United States Patent
Langsdorf et al.

(10) Patent No.: US 6,349,836 B1
(45) Date of Patent: Feb. 26, 2002

(54) WING TAPPING PLATE FOR SPIN-ON FILTERS

(75) Inventors: Brian J. Langsdorf, Perrysburg; Christopher Reamsnyder, Ottawa; Brian Borger, Oregon, all of OH (US); Curt Schroeder, San Pedro, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/316,578

(22) Filed: May 21, 1999

(51) Int. Cl.[7] ............................................. B01D 35/02
(52) U.S. Cl. ................................ 210/443; 210/DIG. 17
(58) Field of Search ................................ 210/440, 441, 210/443, 444, 445, 450, 455, 232, 238, 497.01, DIG. 17; 55/502, 495, 496

(56) References Cited

U.S. PATENT DOCUMENTS

| | | | |
|---|---|---|---|
| 3,256,989 A | * | 6/1966 | Hultgren |
| 4,369,113 A | | 1/1983 | Stifelman |
| 4,719,012 A | * | 1/1988 | Groezinger et al. |
| 4,834,885 A | * | 5/1989 | Misgen et al. |
| 4,969,994 A | * | 11/1990 | Misgen et al. |
| 5,490,930 A | * | 2/1996 | Krull |
| 5,525,226 A | * | 6/1996 | Brown et al. |

* cited by examiner

*Primary Examiner*—W. L. Walker
*Assistant Examiner*—David Sorkin

(57) ABSTRACT

A filter assembly is provided having a generally cylindrical housing defining a housing edge. A filtering element is disposed in the housing for filtering the fluid. A generally circular unitary tapping plate is also provided having a fluid inlet port, a fluid outlet port, and mounting means for removably mounting the filter assembly to the fluid circulation system. The unitary tapping plate further having a generally U-shaped portion defining an inboard seal retaining groove and a wing portion extending radially outwardly from said U-shaped portion. The edge of the housing surrounds the tapping plate and is folded inwardly over the wing portion of the tapping plate such that a free end of the housing edge generally terminates in the seal-retaining groove. The filter assembly also includes an external seal having a generally rectangular cross-section that is retained in the seal retaining groove. The wing portion of the tapping plate enables the outer diameter of the housing and the filtration area of the filtering element to be increased, without increasing the diameter of the external seal.

11 Claims, 1 Drawing Sheet

WING TAPPING PLATE FOR SPIN-ON FILTERS

CROSS-REFERENCE TO RELATED APPLICATIONS

This application is related to U.S. Patent application Ser. No. 09/304,147 now U.S. Pat. No. 6,155,431, entitled "FILTER ASSEMBLY" and U.S. Patent application Ser. No. 09/304,146 now U.S. Pat. No. 6,202,859, entitled "JSEAM TAPPING PLATE WITH GASKET GROOVE FOR SPIN-ON FILTER ASSEMBLIES," which disclose common subject matter.

FIELD OF THE INVENTION

The present invention relates to a spin-on fluid filter and, more particularly, to a tapping plate for a spin-on fluid filter, wherein the tapping plate includes a wing portion that increases the filter diameter and an inboard gasket groove that receives and retains a lathe-cut gasket.

BACKGROUND OF THE INVENTION

Fluid filters are commonly used in engine lubrication systems, hydraulic systems, and fuel systems to remove solid materials, such as dirt and abrasives, from the fluid being circulated. Traditionally, fluid filters include a filtering member or element disposed within a main body, casing, or housing. A tapping plate or cover is fastened to the main body to enclose the filtering member. The tapping plate includes a plurality of openings to enable fluid flow through the filtering member. The fluid flow may be either directed into the filter through a central opening in the tapping plate or through a plurality of circumferential openings disposed radially about the tapping plate. The fluid filter is typically mounted to the engine or hydraulic system by spinning the tapping plate onto a filter mount extending from the engine or hydraulic system. This type of mounting method is commonly known as a spin-on type.

A uniquely shaped primary sealing element or gasket traditionally extends from the exterior of the tapping plate to seal a volume between the tapping plate and the filter mount. Depending on the specific design of the engine or hydraulic system, the sealing element may be positioned in either an inboard position or an outboard position relative to the main body diameter. The unique shapes of these specialized gaskets are used to enable the gaskets to be more readily secured to the tapping plate. Uniquely formed gaskets, such as those shown in U.S. Patent Nos. 4,834,885 and 4,969,994, have the distinct disadvantage of requiring special manufacturing techniques to produce. These special manufacturing techniques almost inherently require added costs.

Alternatively, die casted tapping plates are occasionally used. These die casted tapping plates normally include specialized seal retaining means for retaining lathe-cut gaskets. Lathe-cut gaskets are more readily and economically produced relative to the specialized gasket described above. However, die casted tapping plates are generally more expensive to tool and manufacture relative to stamp-formed tapping plates. Some prior art designs have attempted to combine a stamp-formed cover with a steel baseplate to be used as a tapping plate assembly. The gasket is retained in the cover and the cover is welded to the baseplate for added rigidity. An example of this combination design is shown in U.S. Pat. No. 5,490,930. However, it should be appreciated that this design requires additional parts and processing steps, which inherently increases the cost of manufacturing.

A second seal is commonly used to prevent fluid flow between the tapping plate and the main body. An example of this second seal design is shown in U.S. Pat. No. 4,369,113. The second seal is typically secured in place by a series of metal folds or double-rolls formed in the main body and the tapping plate. Although this arrangement appears to be temporarily effective, it may not afford maximum leakage protection during severe operating conditions. Specifically, it is believed that the two-seal design may fail to prevent fluid leakage when exposed to hydrostatic pressure or hydrodynamic impulses. Such severe operating conditions commonly occur in industrial or heavy-equipment applications, but may also occur in passenger car applications.

Metal folds are also commonly used for joining and sealing the main body to the tapping plate. More particularly, a free end of the tapping plate is rolled or crimped together with a free end of the main body. The combination is typically rolled twice and crimped to form a bead around the edge of the filter assembly. Although this method also appears to be temporarily effective, it is not believed to afford maximum leakage protection during severe conditions. Similar to the two-seal design, the double-rolled bead may fail to prevent fluid leakage when exposed to hydrostatic pressure or hydrodynamic impulses. Moreover, the double-rolled seam is relatively expensive to manufacture and may require seam assembly control and/or additional sealing compounds to produce a reliable interconnection, as variations in seam integrity and welding may occur. Sealing compounds are typically applied during manufacturing to limit fluid leakage through the main body and tapping plate interconnection.

Accordingly, there exists a need in the relevant art to provide a spin-on fluid filter having a tapping plate capable of effectively retaining an economical lathe-cut gasket, rather than a more expensive uniquely-formed gasket. Furthermore, there exists a need in the relevant art to provide a stamp-formed tapping plate capable of retaining the lathe-cut gasket in an inboard position.

SUMMARY OF THE INVENTION

In accordance with the broad teachings of this invention, a spin-on fluid filter having an advantageous construction is provided.

It is an object of the present invention to provide a spin-on fluid filter having a tapping plate capable of effectively retaining an economical lathe-cut gasket, rather than a uniquely formed gasket. It is also an object of the present invention to provide a stamp-formed tapping plate capable of retaining a lathe-cut gasket in an inboard position.

According to a preferred embodiment of the present invention, a filter assembly is provided having a generally cylindrical housing defining a housing edge. A filtering element is disposed in the housing for filtering the fluid. A generally circular unitary tapping plate is also provided having at least one fluid inlet port, at least one fluid outlet port, and mounting means for removably mounting the filter assembly to the fluid circulation system. The unitary tapping plate further includes a generally U-shaped portion defining an inboard seal retaining groove and a wing portion extending radially outwardly from said U-shaped portion. The edge of the housing surrounds the tapping plate and is folded inwardly over the wing portion of the tapping plate such that a free end of the housing edge generally terminates in the seal-retaining groove. The filter assembly also includes an external seal having a generally rectangular cross-section that is retained in the seal retaining groove. The wing portion of the tapping plate enables the outer diameter of the housing and the filtration area of the filtering element to be increased, without increasing the diameter of the external seal.

According to a more preferred embodiment of the present invention, the external seal is an economically formed resilient, lathe-cut gasket and the tapping plate has a stamp-formed one-piece construction.

Further areas of applicability of the present invention will become apparent from the detailed description provided hereinafter. It should be understood however that the detailed description and specific examples, while indicating the preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
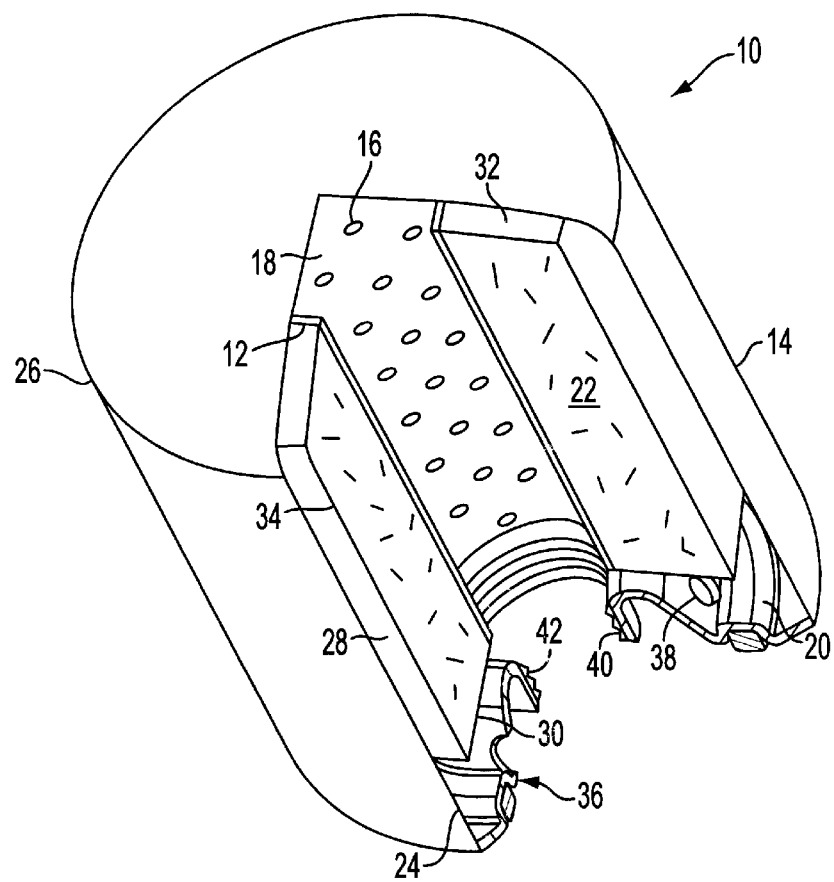
FIG. 1 is a bottom perspective view, with portions in cross-section, of a spin-on filter assembly having an J-seam tapping plate for use with lathe-cut gaskets according to the principles of the present invention.

The following description of the preferred embodiments is merely exemplary in nature and is in no way intended to limit the invention, its application, or uses. For example, the tapping plate of the present invention may find utility in various filter applications, such as, but not limited to, those used in lubrication systems, hydraulic systems, and fuel systems.

Referring to the drawings, a filtering device or assembly 10 is shown according to the principles of the present invention. Filtering assembly 10 is adapted to be mounted to a filter mount (not shown) of an engine. Specifically, filtering assembly 10 is adapted to be operably mounted to and in communication with a lubrication system, hydraulic system, fuel system, or other fluid circulation system, which benefits from fluid filtration.

Filtering assembly 10 includes a generally cylindrical sleeve or barrier 12 disposed within a housing, casing, or support structure 14. Cylindrical sleeve 12 includes a plurality of apertures 16 formed therethrough. A first volume 18 is defined by the interior of cylindrical sleeve 12. A second volume 20 is defined by the exterior of cylindrical sleeve 12 and the interior of housing 14. Apertures 16 of cylindrical sleeve 12 enable filtered fluid to flow from second volume 20 to first volume 18, or vice versa.

Filtering assembly 10 further includes a porous filtering element or member 22 for removing solid materials, such as dirt and abrasives, from the fluid being circulated. Filtering member 22 is disposed in second volume 20 adjacent cylindrical sleeve 12 and extends generally from a top portion 24 of housing 14 to a bottom portion 26 of housing 14. Filtering member 22 is preferably cylindrically shaped having an outer diameter less than the inner diameter of housing 14 and an inner diameter substantially equal to an outer diameter of cylindrical sleeve 12. This arrangement thereby defines a fluid channel 28 extending around a top portion 30, a bottom portion 32, and an outer diameter 34 of filtering member 22.

As best seen in FIG. 1, a tapping or cover plate 36 is coupled to top portion 24 of housing 14. Tapping plate 36 and the interconnection between tapping plate 36 and housing 14 will be described in detail below. Tapping plate 36 includes a plurality of fluid inlet ports 38 positioned adjacent a central threaded aperture 40. Fluid inlet ports 38 are in fluid communication with second volume 20 and, thus, are adapted to introduce and permit a fluid, such as engine oil, to flow through filtering member 22. Central threaded aperture 40 of tapping plate 36 is adapted to engage a typical filter mount (not shown) of an engine. As is known in the art, filter mounts generally include a generally flat surface adapted to receive a seal and a central threaded stud adapted to engage and retain a threaded aperture of a filter.

Central threaded aperture 40 of tapping plate 36 defines a fluid outlet port 42. Fluid outlet port 42 is in fluid communication with first volume 18 and, thus, is adapted to permit filtered fluid from filtering member 22 to flow out fluid outlet port 42. Consequently, a fluid path extends from fluid inlet ports 38 and fluid channel 28 through filtering member 22 and the plurality of apertures 16 of cylindrical sleeve 12 to fluid outlet port 42.

Figure 2:
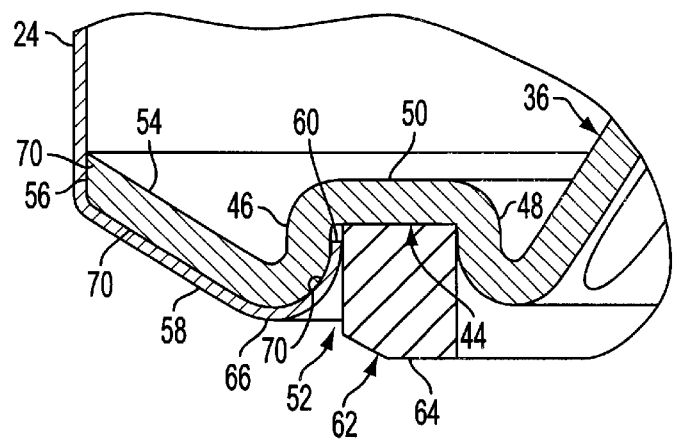
FIG. 2 is a partial cross-sectional view taken along line 2—2 of FIG. 1.

Tapping plate 36 and the interconnection between tapping plate 36 and housing 14 will now be described in detail. As best seen in FIG. 1, tapping plate 36 is generally a concave circularly-shaped one-piece member having, as described above, a plurality of fluid inlet ports 38 positioned adjacent central threaded aperture 40. Tapping plate 36 is preferably stamped or pressed-formed, thereby enabling tapping plate 36 to be more economical produced relative to die cast plates. Referring now to FIG. 2, tapping plate 36 includes an outwardly facing U-shaped groove or recess 44 having first and second legs 46, 48 extending therefrom. First and second legs 46, 48 are positioned such that they are generally perpendicular to a base portion 50, thereby defining a seal-retaining groove 52. Tapping plate 36 further includes a wing portion 54 extending radially outwardly from first leg 46 of U-shaped groove 44. Wing portion 54 preferably extends at an angle away from the filter mount of the engine and includes an end portion 56 that is generally parallel and aligned with top portion 24 of housing 14.

To effect a seamless interconnection and reliable seal between tapping plate 36 and housing 14, a housing edge 58 of housing 14 extends around top portion 24 and is folded, using mechanical means known in the At, substantially around wing portion 54 of tapping plate 36. A free end 60 of housing edge 58 is generally positioned such that free end 60 generally terminates substantially within seal retaining groove 52. It is anticipated, however, that free end 60 of housing edge 58 may extend around seal retaining groove 52 and terminates in a volume between tapping plate 36 and the filter mount (not shown) for improved leakage protection. Such folding of free end 60 around wing portion 54 produces an interconnection having a J-shaped profile that minimizes fluid leakage caused by hydrostatic pressure and hydrostatic impulses. It should be appreciated that a sealing compound 70 may be disposed between wing portion 54 of tapping plate 36 and housing edge 58 of housing 14 to provide a rigid bond therebetween for improved sealing and torque removal.

A seal 62 is further provided for minimizing fluid leakage between tapping plate 36 and the filter mount (not shown) of the engine. Preferably, seal 62 is a lathe-cut gasket having a generally rectangular cross-section. Seal 62 is preferably press-fit in seal retaining groove 52, however, alternative methods of retaining seal 62 may be used depending on the filter application and related operating conditions. Seal 62 is arranged such that a sealing portion 64 of seal 62 extends beyond a top portion 66 of housing edge 58. It should be appreciated that sealing portion 64 of seal 62 may extend any distance beyond top portion 66, which is conducive to minimizing fluid leakage in a particular application.

The filter assembly of the present invention is advantageous over conventional filter assemblies in that the present invention enables a lathe-cut gasket to be secured to a stamp-formed, one-piece tapping plate without the use of welds, die casts, or double-rolled seams. As described above, lathe-cut gaskets are typically more cost effective to manufacture than uniquely shaped gaskets frequently used in conventional filter assemblies. Moreover, the lathe-cut gasket design is believed to provide an improved sealing surface between the gasket and the filter mount. Similarly, the ability to stamp-form the tapping plate enables low cost filters to be produces, since stamping is typically more cost effective than die casting. Lastly, the ability to employ a J-seam interconnection between the tapping plate and the main body enables the fluid filter to withstand severe operating conditions, such as hydrostatic pressure and hydrodynamic impulses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A filter assembly for use in a fluid circulation system, said filter assembly comprising:
   a cylindrical housing defining a housing edge;
   a filtering element disposed in said housing for filtering a fluid;
   a circular unitary tapping plate having a fluid inlet port, a fluid outlet port, and mounting means for removably mounting the filter assembly to the fluid circulation system disposed therein, said unitary tapping plate further having a generally U-shaped portion defining an inboard seal retaining groove having a flat bottom and a wing portion extending radially outwardly from said generally U-shaped portion, said wing portion increasing an outer diameter of said housing for increased filtration area of said filtering element, said housing edge surrounding and being folded inwardly over said wing portion of said tapping plate such that a free end of said housing edge is terminated in said seal retaining groove; and
   an external seal having a generally rectangular cross-section retained in said seal retaining groove, the cross section of said seal having a flat bottom and two sides perpendicular to the flat bottom of said seal, such that the flat bottom of said seal seats against the flat bottom of said seal retaining groove.

2. The filter assembly according to claim 1 wherein said external seal is a resilient lathe-cut gasket.

3. The filter assembly according to claim 1 wherein said unitary tapping plate is stamp-formed.

4. The filter assembly according to claim 1, further comprising a sealing compound disposed between said housing edge and said wing portion of said tapping plate.

5. The filter assembly according to claim 1 wherein said mounting means includes an aperture surrounded by a central threaded portion of said unitary tapping plate, said aperture including said fluid outlet port.

6. A spin-on fluid filter for an engine, said engine having a filter mount, said spin-on fluid filter comprising:
   a cylindrical casing defining a casing edge;
   a filtering element disposed in said casing for filtering a fluid;
   a circular cover plate having a central aperture surrounded by a threaded portion of the cover plate for engaging the filter mount of the engine and providing an outlet port for said fluid, said cover plate including an inlet port for said fluid, said cover plate further having a recessed portion defining an inboard seal retaining groove having a flat bottom and a wing portion extending radially outwardly from said recessed portion, said wing portion increasing an outer diameter of said casing for increased filtration area of said filtering element, said casing edge surrounding and being folded inwardly over said wing portion of said cover plate such that a free end of said casing edge is terminated in said seal retaining groove; and
   a seal, retained in said seal-retaining groove, having a generally rectangular cross-section for preventing fluid leakage between said cover plate and the filter mount of the engine, the cross section of said seal having a flat bottom and two sides perpendicular to the flat bottom of said seal, such that the flat bottom of said seal seats against the flat bottom of said seal retaining groove.

7. The spin-on fluid filter according to claim 6 wherein said seal includes a resilient lathe-cut gasket disposed in said retaining groove.

8. The spin-on fluid filter according to claim 6 wherein said unitary tapping plate is stamp-formed.

9. The spin-on fluid filter according to claim 6, further comprising a sealing compound disposed between said casing edge and the wing portion of said cover plate.

10. A fluid filter for use in a fluid circulation system, said fluid filter comprising:
    a cylindrical housing defining a housing edge;
    a filtering member disposed in said housing for filtering a fluid;
    a one-piece tapping plate having a central aperture surrounded by a threaded portion of the tapping plate for engaging the filter mount of the engine and for providing an outlet port for said fluid, said tapping plate being stamp-formed and including an inlet port for said fluid, said one-piece tapping plate further having a generally U-shaped portion defining a seal retaining groove having a flat bottom and a wing portion extending radially outwardly from said generally U-shaped portion, said wing portion increasing an outer diameter of said housing for increased filtration area of said filtering element, said housing edge surrounding and being folded inwardly over said wing portion of said tapping plate such that a free end of said housing edge is terminated in said seal retaining groove; and
    a resilient lathe-cut gasket having a generally rectangular cross-section retained in said seal retaining groove, the cross section of said gasket having a flat bottom and two sides perpendicular to the flat bottom of said seal, such that the flat bottom of said gasket seats against the flat bottom of said seal retaining groove.

11. The fluid filter according to claim 10, further comprising a sealing compound disposed between said housing edge and the wing portion of said tapping plate.

* * * * *